United States Patent
Liu

[11] Patent Number: 6,024,467
[45] Date of Patent: Feb. 15, 2000

[54] TUBULAR, BARREL-SHAPED, LASER POINTER FOR GENERATING VARIED OPTICAL EFFECTS

[76] Inventor: Yuan Tsang Liu, No.2, Lane 71, Man Ping St.Pan Chiao, Taipei Hsien, Taiwan

[21] Appl. No.: 09/205,703

[22] Filed: Dec. 4, 1998

[51] Int. Cl.[7] .................................................. F21K 27/00
[52] U.S. Cl. .......................... 362/259; 362/202; 362/203; 362/205; 362/118
[58] Field of Search .................................. 362/259, 202, 362/203, 205, 118

[56] References Cited

U.S. PATENT DOCUMENTS

| | | | |
|---|---|---|---|
| 5,029,970 | 7/1991 | Hengst et al. | 385/88 |
| 5,788,359 | 8/1998 | Halsey et al. | 362/118 |
| 5,791,766 | 8/1998 | Lee | 362/259 |
| 5,897,200 | 4/1999 | Ho | 362/259 |

*Primary Examiner*—Thomas M. Sember
*Assistant Examiner*—Ronald E. DelGizzi
*Attorney, Agent, or Firm*—Rosenberg, Klein & Lee

[57] ABSTRACT

A laser pointer includes a first metal barrel having a first end closed with a metal screw cap, and a second end, which is opened, the first metal barrel holding a battery set, a control circuit board, an axially extended spring member and a laser diode supported on the axially extended spring member and extended out of the second end of the first metal barrel; a second metal barrel having a first end opened and coupled to the second end of the first metal barrel by a screw joint, and a second end opened, the second metal barrel being moved axially relative to the first metal barrel upon a rotary motion; and a socket mounted in the first end of the second metal barrel and moved with the second metal barrel axially between a first position where the socket is coupled to the laser diode to compress the axially extended spring member and hold the laser diode in position, and a second position where the socket is released from the laser diode, enabling the laser diode to be oscillated with the axially extended spring member when the laser pointer is oscillated by hand.

8 Claims, 4 Drawing Sheets it is one object of the present invention to provide a laser
TUBULAR, BARREL-SHAPED, LASER POINTER FOR GENERATING VARIED OPTICAL EFFECTS

BACKGROUND OF THE INVENTION

The present invention relates to laser pointers, and more particularly to such a laser pointer that can be arranged between a first position where the laser diode is firmly secured in position, and a second position where the laser diode can be oscillated with a spring member.

A variety of laser pointers have been disclosed, and have appeared on the market. These laser pointers are commonly comprised of a cylindrical casing holding a battery set, a control circuit board, a laser module and a lens. The laser module which holds a laser beam is fixedly mounted inside the casing, and controlled to emit a laser beam. Because the laser module is not movable relative to the casing, the static lighting effect is less attractive. In order to produce a dynamic lighting effect, complicated driving means and reflector means shall be installed. However, a laser pointer which has complicated driving means and reflector means for producing dynamic lighting effects is heavy and not handy.

SUMMARY OF THE INVENTION

It is one object of the present invention to provide a laser pointer which is handy. It is another object of the present invention to provide a laser pointer which can be set between a first position where the laser diode is firmly secured in position, and a second position where the laser diode can be oscillated with a spring member to produce a dynamic lighting effect. It is still another object of the present invention to provide a laser pointer which produces a patterned spot of light. According to one aspect of the present invention, the laser pointer comprises a first metal barrel having a first end closed with a metal screw cap, and a second end, which is opened, the first metal barrel holding a battery set, a control circuit board, an axially extended spring member and a laser diode supported on the axially extended spring member and extended out of the second end of the first metal barrel; a second metal barrel having a first end opened and coupled to the second end of the first metal barrel by a screw joint, and a second end opened, the second metal barrel being moved axially relative to the first metal barrel upon a rotary motion; and a socket mounted in the first end of the second metal barrel and moved with the second metal barrel axially between a first position where the socket is coupled to the laser diode to compress the axially extended spring member and hold the laser diode in position, and a second position where the socket is released from the laser diode, enabling the laser diode to be oscillated with the axially extended spring member when the laser pointer is oscillated by a user's hand. According to another aspect of the present invention, the lens comprises a patterned light permeable area and an opaque border area surrounding the patterned light permeable area.

DETAILED DESCRIPTION OF THE PREFERRED EMBODIMENT

Figure 1:
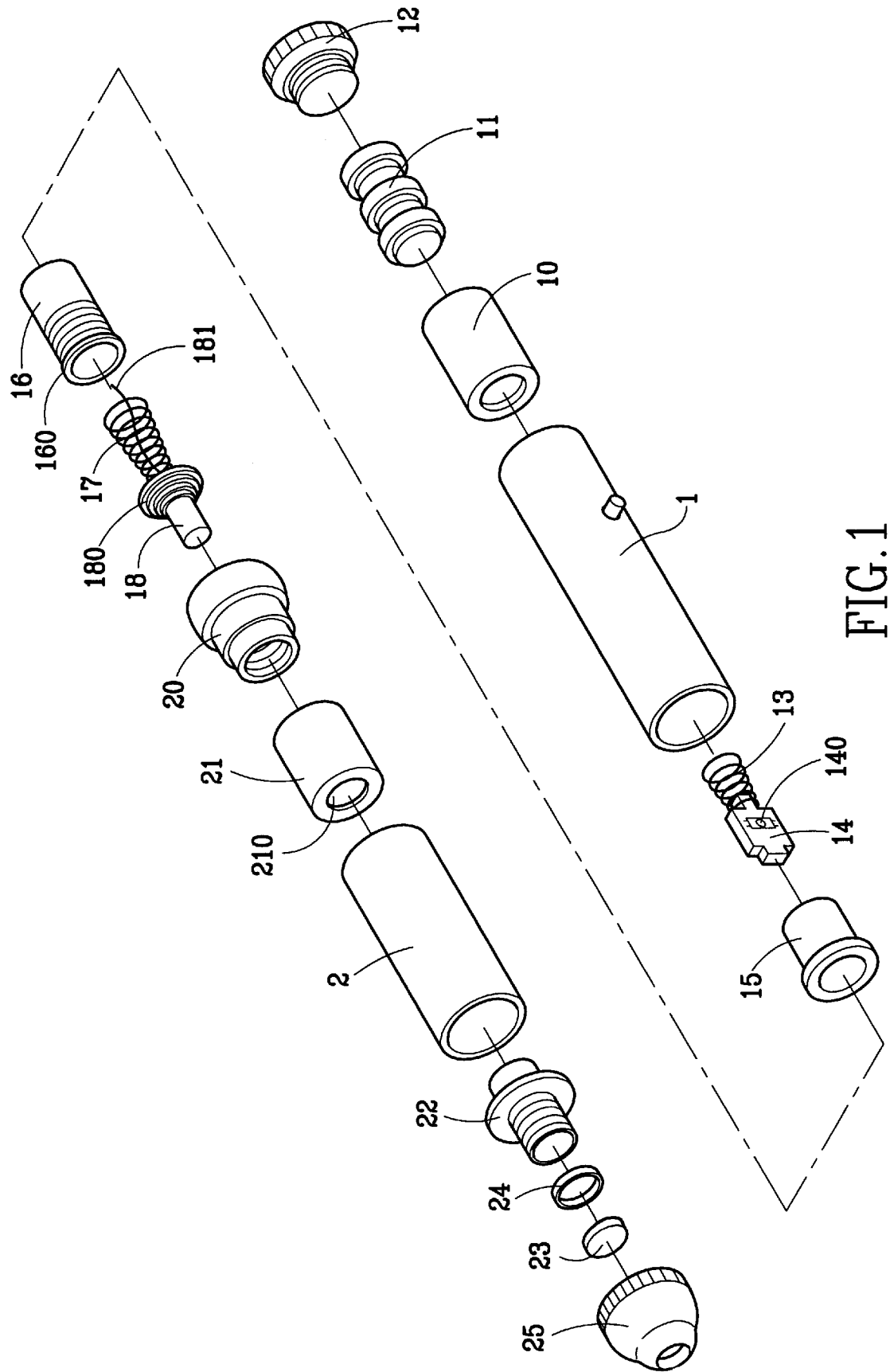
FIG. 1 is an exploded view of a laser pointer according to the present invention.
Figure 2:
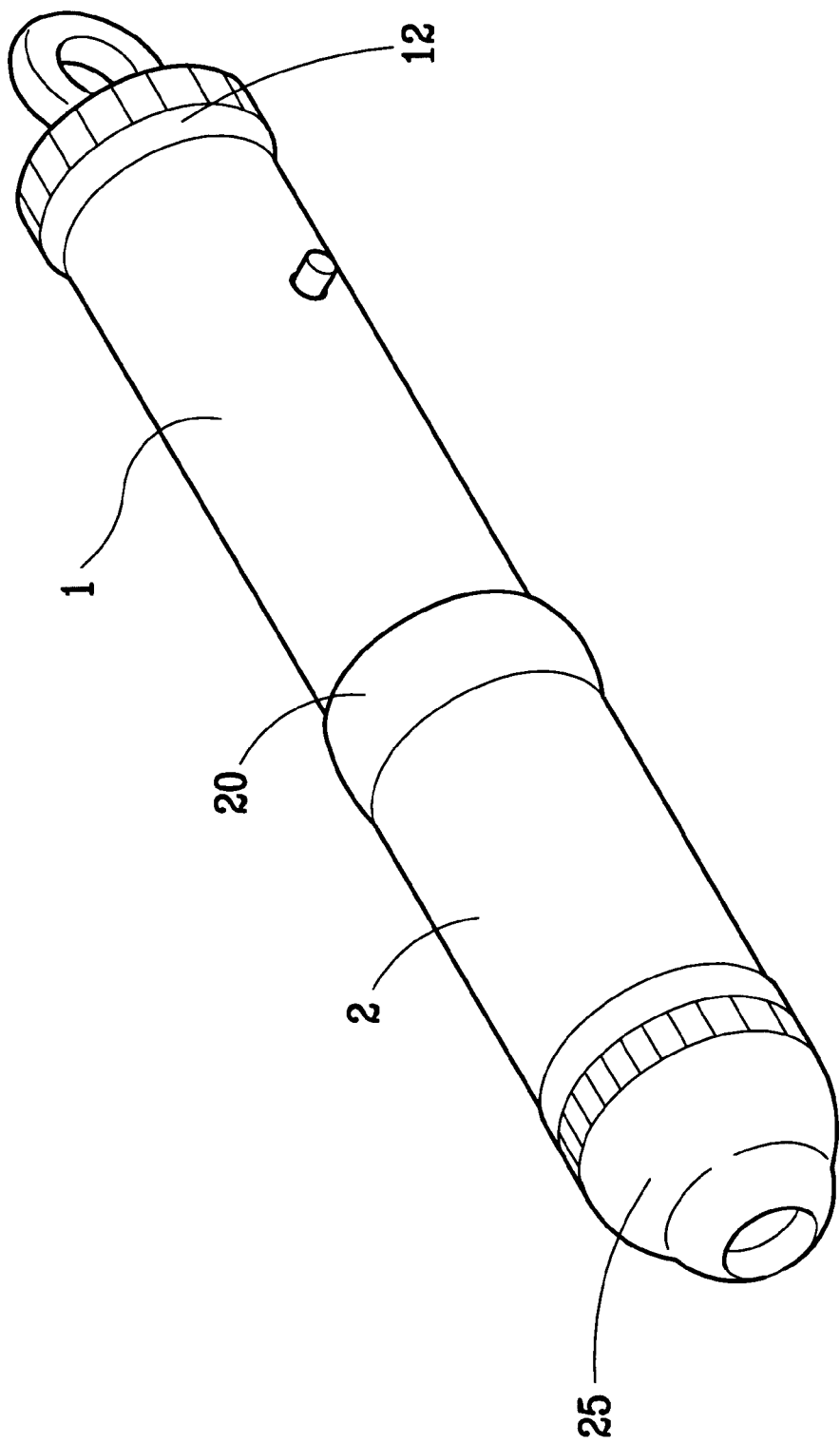
FIG. 2 is an elevational view of the laser pointer according to the present invention.

Referring to FIGS. 1 and 2, a laser pointer in accordance with the present invention comprises a first metal barrel 1, and a second metal barrel 2. An electrically insulative, cylindrical battery holder 10 is mounted in the first metal barrel 1 to hold a battery set 11. A metal screw cap 12 is fastened to one end of the first metal barrel 1 by a screw joint 31 and contacts a first terminal 41 of the battery set 11. A first metal spring 13 is mounted inside the first metal barrel 1, and stopped at a second terminal 42 of the battery set 11. The opposite end of the first metal spring 13 is connected to the first terminal of a control circuit board 14, which comprises a switch 140. A hollow, cylindrical metal end cap 15 is fastened to one end of the first metal barrel 1 remote from the metal screw cap 12, and disposed in contact with a second terminal of the control circuit board 14. An externally threaded bushing 16 is mounted in the metal end cap 15. The bushing 16 has an outward stop flange 160 raised around the periphery at its one end. A second metal spring 17 is mounted in the bushing 16, and connected to the control circuit board 14. The opposite end of the second metal spring 17 is connected to the base 180 of a laser diode 18. A control line 181 is connected between the base 180 of the laser diode 18 and the control circuit board 14. The base 180 is a circular, stepped member. The second metal barrel 2 has one end mounted with a connector 20. The connector 20 is fixedly fastened to one end of the second metal barrel 2, and threaded onto the threaded outside wall of the bushing 16. By means of turning the connector 20, the second metal barrel 2 is moved axially relative to the first metal barrel 1. A socket 21 is fixedly mounted inside the second metal barrel 2 and contacts part of the connector 20, and has a center hole 210 at the center of its one end through which the laser diode 18 passes. The socket 21 can be moved with the second metal barrel 2 relative to the first metal barrel 1. The opposite end of the second metal barrel 2 is mounted with a lens holder 22. A laser firing cap 25 is fastened to the lens holder 22 by a screw joint to hold a lens 23 and a packing ring 24 around the lens 23.

Figure 3:
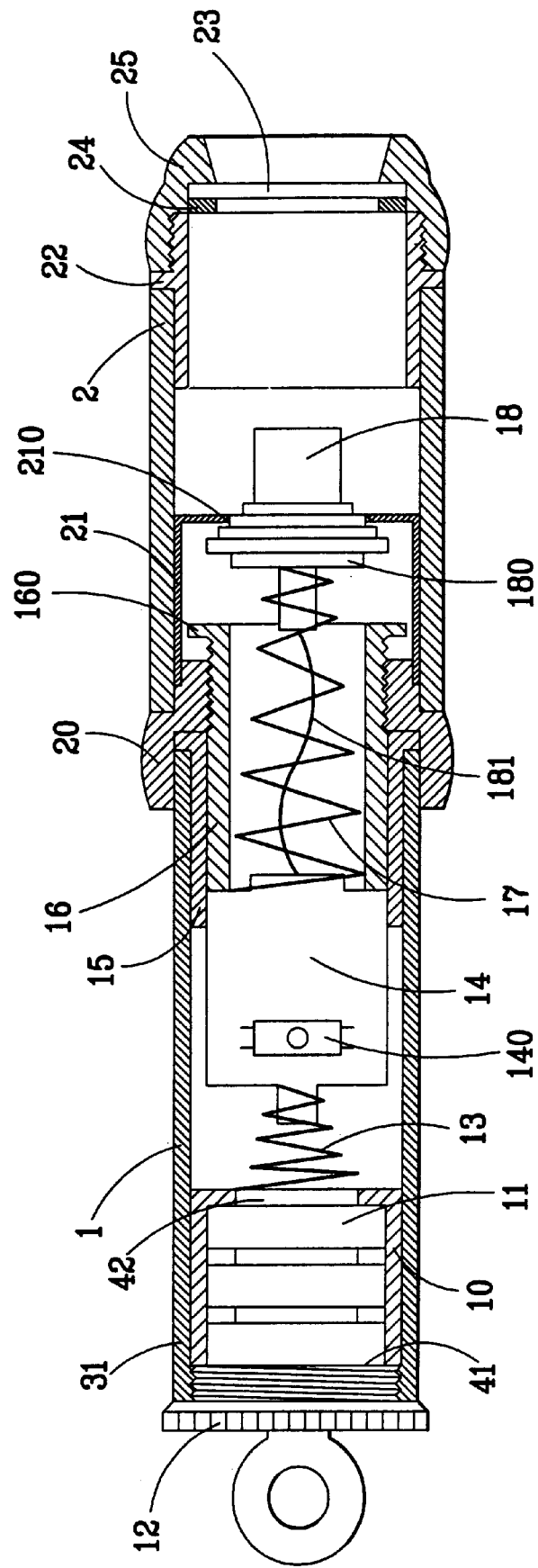
FIG. 3 is a longitudinal view in section of the present invention, showing the laser diode held in static position.

Referring to FIG. 3, when the connector 20 is rotated in one direction, the second metal barrel 2 is moved axially backwards relative to the first metal barrel 1, enabling the center hole 210 of the socket 21 to be forced into engagement with the circular, stepped base 180 of the laser diode 18 (at this time, the second metal spring 17 is compressed), and therefore the laser diode 18 is retained in position. When the switch 140 of the control circuit board 14 is switched on, the laser diode 18 is triggered to emit a laser beam out of the laser firing cap 25 through the lens 23.

Figure 4:
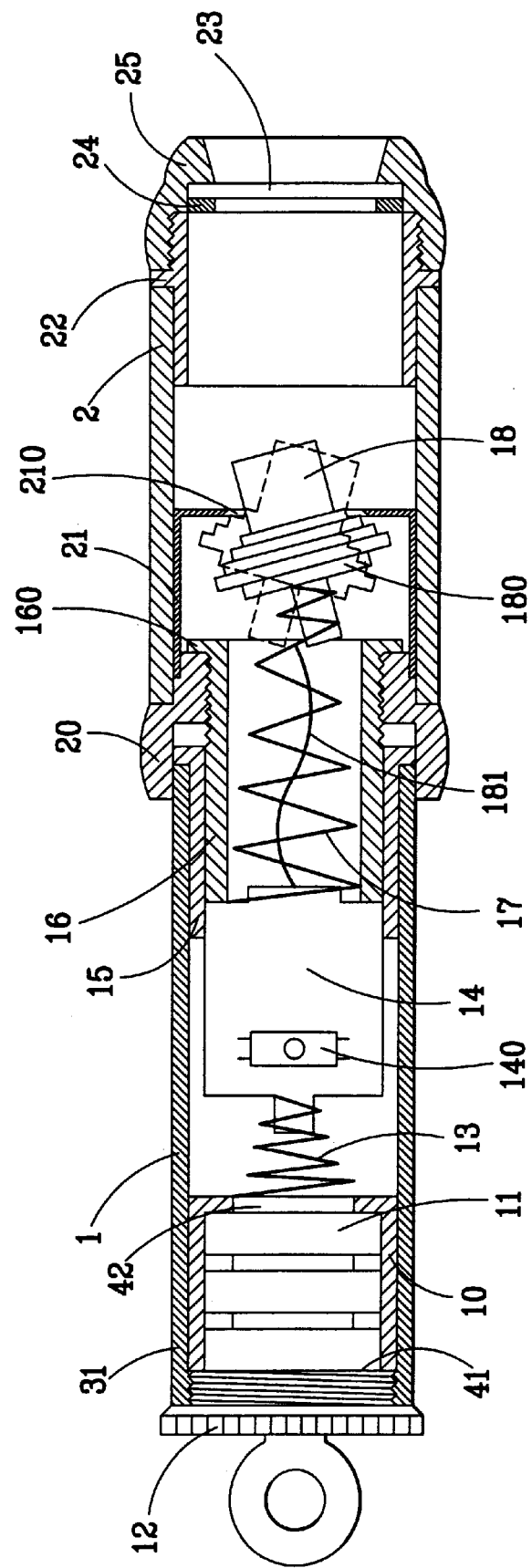
FIG. 4 is similar to FIG. 3 but shows the laser diode being oscillated.

Referring to FIG. 4, when the connector 20 is rotated in the opposite direction, the second metal barrel 2 is moved axially forwards relative to the first metal barrel 1, and the socket 21 is moved with the second metal barrel 2 away from the circular, stepped base 180 of the laser diode 18, and therefore the second metal spring 17 is released and, the laser diode 18 is suspended in the second metal barrel 2 and can be oscillate along with the second metal spring 17. When the switch 140 of the control circuit board 14 is switched on, an annular spot of laser light can be obtained by aiming the laser beam from the laser pointer at an object and at the same time rotating the laser pointer.

Further, the lens 23 can be a plane lens, convex lens or concave lens. Alternatively, the lens 23 can be made having a patterned light permeable area and an opaque border area surrounding the patterned light permeable area. When the laser beam passes through the patterned light permeable area, a patterned light spot is produced at the surface of the target.

While only one embodiment of the present invention has been shown and described, it will be understood that various modifications and changes could be made thereunto without departing from the spirit and scope of the invention disclosed.

What the invention claimed is:

1. A tubular, barrel-shaped laser pointer for generating varied optical effects comprising:

a first metal barrel having first and second open end portions, said first open end portion having threads formed therein;

a metal screw cap in threaded engagement with said first open end portion;

a battery set mounted within said first metal barrel;

a control circuit board mounted within said first metal barrel;

a first spring member positioned within said first metal barrel, said first spring member elastically and electrically coupling said battery set to said control circuit board;

a laser diode located within a second metal barrel;

a second spring member elastically and electrically coupling said laser diode to said control circuit board;

said second metal barrel having a first end portion wherein said first end portion threadedly engages said second open end portion of said first metal barrel and said second metal barrel displaces axially with respect to said first metal barrel upon rotation of said second metal barrel about said first metal barrel;

a socket fixedly mounted within said first end portion of said second metal barrel, said socket in contact with said laser diode when said second metal barrel is in a first axial position, said second metal spring maintaining said contact between said socket and said laser diode, said laser diode being held in a substantially stable position with respect to said socket, said second metal barrel having a second axial position wherein said laser diode is displaced from said socket, said second metal spring for permitting displaceable and oscillatory motion of said laser diode within said second metal barrel when said laser pointer is displaced to create optical effects.

2. The laser pointer of claim 1 wherein the second end portion of said first metal barrel is fixedly mounted with a hollow, cylindrical metal end cap and a metal bushing in said metal end cap, said metal bushing having an outer thread formed therein, said first end portion of said second metal barrel is fixedly mounted with a connector, said connector having an inner thread threaded onto the outer thread of said metal bushing.

3. The laser pointer of claim 1 wherein an electrically insulating, cylindrical battery holder is mounted inside said first metal barrel to hold said battery set in a first position enabling a first terminal of said battery set to electrically contact said metal screw cap.

4. The laser pointer of claim 3 wherein said control circuit board has a first terminal in electrical communication with a second terminal of said battery set by a metal spring element, and a second terminal of said control circuit board is electrically connected to said second metal spring.

5. The laser pointer of claim 1 wherein a lens is mounted in a second end portion of said second metal barrel.

6. The laser pointer of claim 5 wherein said lens comprises a patterned light-permeable area and an opaque border area surrounding said patterned light permeable area.

7. The laser pointer of claim 5 wherein the second end of said second metal barrel is fixedly mounted with a lens holder, which holds said lens in place, and a laser firing cap fastened to said lens holder by a screw joint to hold said lens in position.

8. The laser pointer of claim 1 wherein said laser diode has a circular, stepped base.

* * * * *